United States Patent Office 3,562,031
Patented Feb. 9, 1971

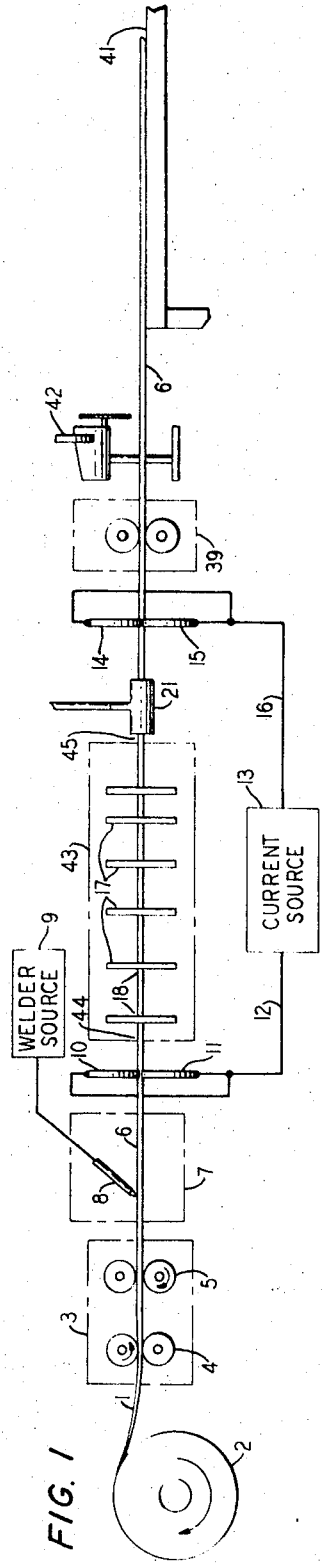
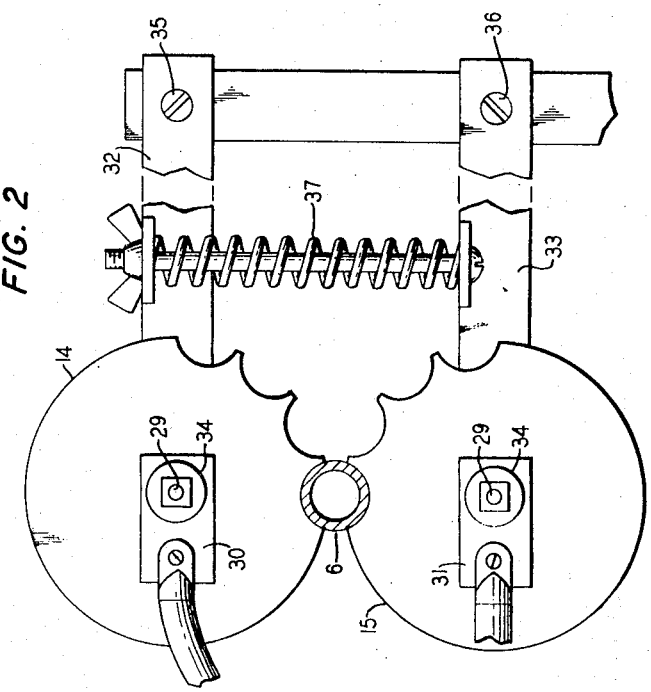
| TUBE SIZE | ¼ x .020 | ⅜ x .035 |
|---|---|---|
| TRAVEL SPEED FT./MIN. | 16 | 11.5 |
| DISTANCE BETWEEN CONTACTS. FT. | 6 | 6½ |
| ANNEALING VOLTAGE | 39 | 37 |
| ANNEALING CURRENT AMPERES | 195 | 390 |
| TEMPERATURE °F | 2100 | 2150 |
FIG. 7
INVENTOR
GLENN J. GIBSON

3,562,031
CONTINUOUS SMALL DIAMETER FERROUS TUBE
MANUFACTURE
Glenn J. Gibson, 97 Beech Ave.,
Berkeley Heights, N.J. 07922
Filed Mar. 29, 1968, Ser. No. 717,273
Int. Cl. C21d 9/08
U.S. Cl. 148—154    6 Claims

ABSTRACT OF THE DISCLOSURE

A process and apparatus for the production of annealed stainless steel tubing in one coninuous operation is disclosed. Resistance heating of the tube is employed through current applied by graphite brushes. A quenching step is achieved before the advancing tube contacts the second brush set. The quenching device, brush configuration and stress-limiting advancement of the tube continuously without buckling or undue stretching are described. Apparatus for practising the process with bright annealing is disclosed which involves maintaining an envelope of inert gas around the resistance heating stage.

FIELD OF THE INVENTION

This invention relates to the manufacture of metal tubing and more particularly concerns a process and apparatus for the continuous production of annealed tubing.

BACKGROUND OF THE INVENTION

The manufacture of annealed tubing at present typically involves feeding metal strip from a reel through a tube forming mill and then through a welding step where the edges are joined and the tubing cut to length. Annealing is then performed as a separate operation. Alternatively, annealing is achieved by passing the tube through one or more electrical coils which inductively heat the tube to the desired annealing temperature before the tubing is cut to length. Following this, the tube is quenched and passed on to be cut or coiled in separate stages.

Several drawback exist in the manufacture of tubing as outlined above, for which neither the tube manufacturing nor related manufacturing arts supply satisfactory solutions. For example, the inductive heating apparatus for small diameter tubing is quite expensive and requires a certain skill to operate and maintain. It thus is ill-suited for use by the smaller tube producers. Another problem is that the above-described processes do not readily lend themselves to the low-cost continuous production of annealed tubing in one fully automatic operation, from the strip reel to the final coiling of the annealed tubing for shipment. This, too, bears heavily on the economics of smaller operations.

Accordingly, one broad object of the invention is to reduce the cost of manufacturing annealed tubing.

Another object of the invention is to produce annealed tubing from strip to a finished coiled product in one continuous operation.

Another object of the invention is to obviate the need for induction heating apparatus in the tube making process.

A further object of the invention is to maintain or improve the material quality of annealed tubing.

A specific object of the invention is to produce stainless steel "beverage" tubing faster and at lower cost than heretofore possible.

SUMMARY OF THE INVENTION

These objects are achieved in accordance with the inventive process, broadly, by several new and interrelated steps including the electrical resistance heating of the tube, a quenching which the advancing tube undergoes prior to contacting the second electrical brush, feeding of the annealed tube directly into a continuous coiler, and careful balancing of the advancing forces upon the tube to assure an unwarped and smooth end product.

The practice of the inventive process is greatly facilitated by certain items of apparatus, hereinbelow to be described in detail, which are noteworthy for their simplicity and low cost. In the electrical resistance heating stage, for example, the tube is frictionally contacted on opposite sides by two sets of stationary brushes, one set located at the hot end and the other set at the cold end. Each brush set may comprise a pair of spring-loaded graphite blocks; or more advantageously, two thick spring-loaded graphite discs which impinge the tube from opposite sides and which are each rotatable to present different sectors of their periphery to the tube. The harsher wear experienced at the cold end owing to the greater abrasiveness of the tube surface after quenching thus is compensated for without need for frequent brush replacement.

In the heating stage the tube is advanced through a series of heat-impervious elements which are more closely spaced at the hot end to counteract with greater force any tendency the hot tube may have to bend. These elements advantageously are asbestos blocks with guide holes whose alignment helps define the prescribed straight-line path for the tube. Further safeguard against tube buckling is achieved by the drive rollers of the continuous coiler located at the far end of the process line whereby the coiler maintains a slight tension in the heated section to prevent buckling.

The quenching step is achieved by feeding the tube through a section of pipe into which a coolant is being constantly forced through two rings of perforations near the respective ends of the pipe. The latter, in turn, is enveloped by a larger diameter pipe which serves as a reservoir for the coolant. The radial flow of the cooling water around the circumference of the hot tube insures uniform cooling which is necessary to maintain straightness in the annealed tube. The water, after impinging the tube, runs out both ends of the pipe.

In practising the inventive process with the specific apparatus disclosed below, factors such as the size of tubing, the speed of advance, the physical distance between contact brushes, the temperature gradient and range within the heating stage and other related parameters must be taken into account in achieving an optimum operation. The more significant relationships and the preferred combinations are set out below.

A greater understanding of these and other objects, features and advantages of the invention will be gained from the detailed description to follow of an illustrative embodiment thereof.

DESCRIPTION OF THE DRAWING

FIG. 1 is a schematic flow diagram illustrating apparatus which practises the invention;

FIG. 2 is a front view of the brush configuration;

FIG. 4 is a sectional side view of the quenching apparatus;

FIG. 7 is a table showing typical process parameter relationships.

DETAILED DESCRIPTION OF AN ILLUSTRATIVE EMBODIMENT

Figure 3:
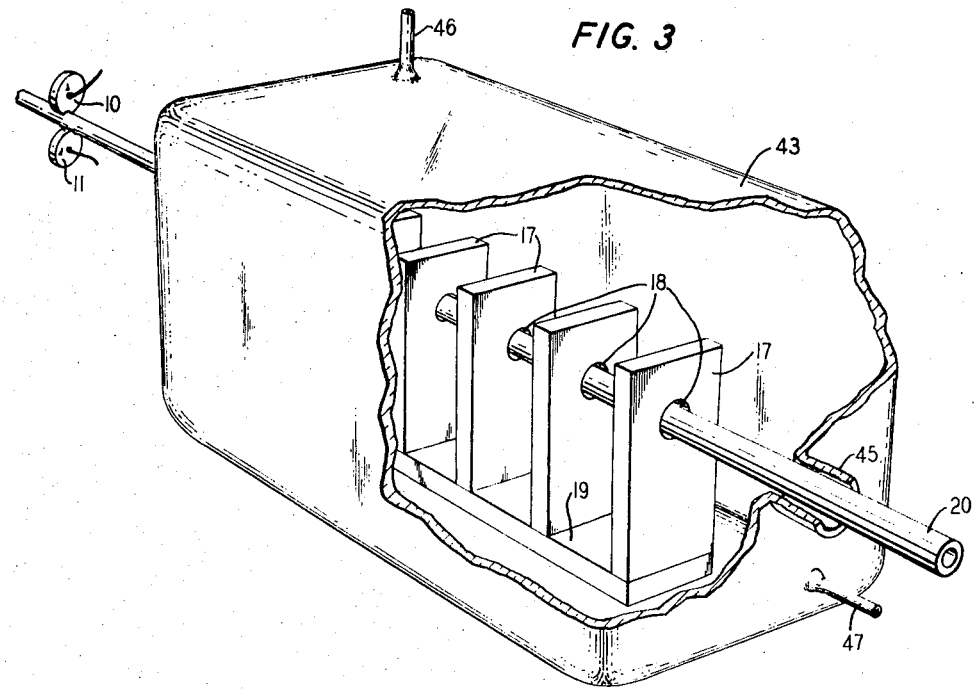
FIG. 3 is a frontal perspective view of an enclosure for the heating stage.

The invention is illustrated below in its application to the manufacture of so-called beverage tubing which typically is stainless steel tube with an outside diameter of 1/4 to 3/8 inches and a wall thickness of about .020 inch, and which must be highly pliable. It is broadly applicable, however, to any small diameter stainless steel tubing, high nickel alloy, or other ferrous alloy tubing that will not harden under water quench.

FIG. 1 illustrates schematically the overall practice of my inventive process. Stainless steel strip, designated 1, is fed from a coil 2 through a conventional tube rolling mill 3 which may consist of one or more roller pairs such as 4 and 5, for example. These form the basic tube shape and also advance the formed tube 6 through the following stages. The tube seam is joined in a welding feature 7 which, for example, may be a tungsten inert gas (TIG) arc welding unit 8 supplied by a source 9.

Pursuant to one facet of the invention, the tube is next directed through a first pair of opposed, solid graphite brushes 10, 11. These are the above-mentioned blocks or discs and are spring-loaded onto the tube to establish equal contact forces. Brushes 10, 11 are connected by conductor 12 to a high power current source 13, the latter advantageously being a constant potential welder capable of supplying 200 to 500 amperes at a constant voltage of from 20–50 volts selected in accordance with the tube size. The second electrical contact with advancing tube 6 is with graphite disc brushes 14, 15, the construction of which is illustrated in more detail in FIG. 2 and will be described shortly. Brushes 14, 15 are connected by conductor 16 to current source 13, which completes a resistive circuit including the portion of advancing tube 6 lying between brushes 10, 11 and brushes 14, 15.

In advancing between the two sets of brushes, tube 6 passes through a series of aligned holes 18 in asbestos blocks 17, as seen in FIGS. 1 and 3. Block 17 are about 1/2 inch thick and are rigidly fastened to a fixture such as 19, with the holes 18 aligned along axis 20 which coincides with the path of advance of tube 6. Holes 18 are slightly larger in diameter than the outside diameter of tube 6, the clearance being about 1/16 inch. The tendency of the tube 6 to buckle while being simultaneously advanced and heated thus is counteracted, particularly at the hot end where the spacing of blocks 17 is about half the spacing as occurs at the cold end.

At a point in the tube's advance which is reached just prior to the cold brushes 14, 15, the quenching step is accomplished advantageously with the quenching device shown in FIG. 4 and designated 21. Quencher 21 consists of an inner cylinder 22, through which the smaller diameter advancing tube 6 passes, and an outer cylinder 23 enveloping cylinder 22 and forming a coolant reservoir 24 surrounding cylinder 22. Two rings 25, 26 of perforations through cylinder 22 occur about one-third and two-thirds, respectively, along its length. These serve as jets through which coolant is forced from inlet 27 and reservoir 24 into the volume between cylinder 22 and tube 6. The coolant, advantageously water, flows from hole rings 25, 26 in a series of jets which radially impinge on the outer surface of tube 6. This action coupled with the complete immersion of tube 6 in the coolant promotes a highly uniform cooling essential to prevent warping of the tube in the cooling step.

The graphite disc brushes 14, 15 of FIG. 2 are disposed adjacent quencher 21. Each comprises a solid graphite disc about three inches in diameter and one inch thick, rotatably mounted from a central threaded rod 29. Bus bars 30, 31 and support arms 32, 33 are secured to the respective rods 29 as with washer nuts 34. Arms 32, 33 are pivoted at fixed points 35, 36, respectively, so that a conventional adjustable tension mechanism designated 37 can be employed with each brush to adjust the force with which it contacts the tube 6. For even heating, it is desirable not only that two brushes be oppositely situated at each contact point, but also that these brushes apply equal force to the tube 6. When the brushes 14, 15 wear down from the abrading effect of tube 6, new brush surfaces—in effect, new brushes—are readily available merely by rotating each brush 14, 15 in turn to a new position. The brush configuration illustrated in brushes 14, 15 advantageously may also be employed with brushes 10, 11.

Serving to keep tube 6 aligned between brushes 14, 15 and coiler 38 is a roller pair 39 which, advantageously, is made of phenolic resin to electrically insulate the drive mechanism from the tube 6. Roller pair 39 optionally is a drive roller which applies a pulling force to tube 6 to help prevent buckling of the hot section when necessary, and to aid in feeding the tube onto the run-out table 41 shown in FIG. 1. Alternatively, when a continuous coiler is used, the drive roller of the coiler may be relied on to help prevent buckling, as will be explained later.

Figure 6:
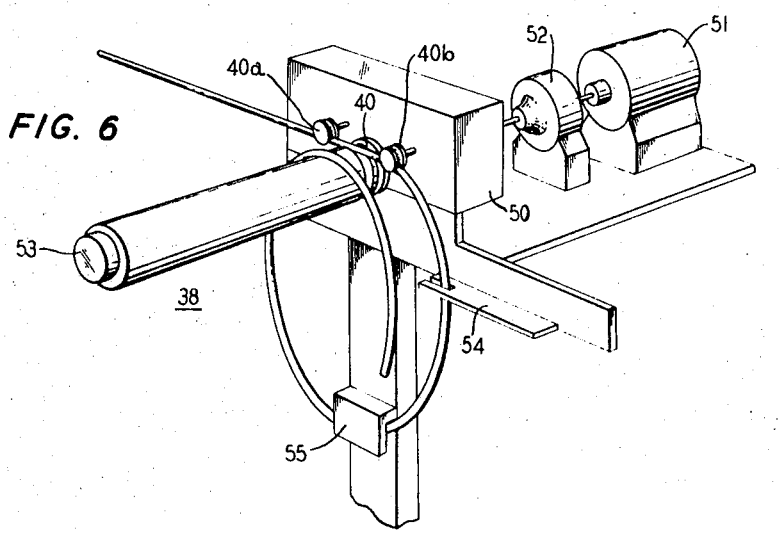
FIG. 6 is a perspective view of the continuous coiling apparatus.

The annealed tube can be collected continuously in linear sections, if desired, as on the run-out table 41. Here, an electric saw such as 42 is a useful expedient in cutting the tube in straight lengths. More advantageously, however, the tube 6 is formed continuously into coils of a selected diameter with the coiling apparatus 38 illustrated in FIGS. 1 and 6. Coiler 38 consists of a drive roller 40 and two idler rollers 40a and 40b mounted in a fixture such as 50 which maintains the rollers in axial alignment with the advancing tube 6.

Roller 40 applies a pulling force or tension to the tube 6 which is sufficiently large to effect the desired coiling. This force, however, must be less than that which would cause the elastic limit of the tube's heated portion to be exceeded. To ensure that result, the power derived from drive roller motor 51 is applied to roller 40 through a torque-limiting clutch 52 whose output torque is adjusted and maintained at a value less than that which would cause the tube 6 to stretch permanently.

The coiled tube is collected on a mandril 53 associated with roller 40, coiling being aided by the guides 54 and 55.

The process as so far described involves open annealing in which the tube 6, while being heated, is exposed to the atmosphere. In consequence, the tube surface occasionally develops a scale which for beverage tube and many other applications must later be removed, as through pickling. The scaling can be avoided, however, by a bright annealing step in which throughout the heating stage, pursuant to another aspect of the invention, the advancing tube is protected by an inert gas such as nitrogen or dissociated ammonia.

FIG. 3 illustrates schematically the practice of bright annealing with the present process. A heat-impervious envelope 43 made of a cement-asbestos compound, for example, is disposed around the entire heating stage. The tube 6 enters at port 44, seen in FIG. 1, which is situated beyond the brushes 10, 11, but prior to where scale-forming heat has developed. Then tube 6 exits at port 45 which, for example, may be adjacent the quencher 21. Gas intake and exhaust manifolds 46, 47 with associated circulating equipment (not shown) service the envelope 43.

Figure 5:
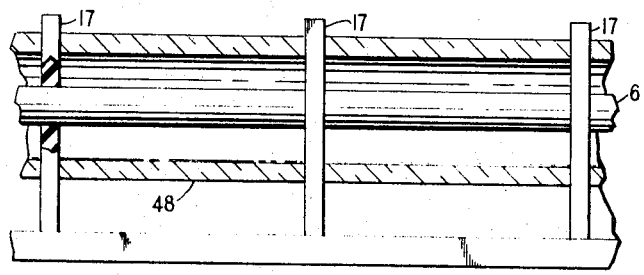
FIG. 5 is a sectional side view of a further enclosure for the heating stage.

Alternatively, the gas container may be composed of lengths of quartz cylinder 48, shown in FIG. 5 as spanning between blocks 17. The inert gas can be circulated in and out of each individual quartz cylinder 48; or, since each quartz cylinder's inside diameter is greater than the diameter of holes 18 in blocks 17, the inert gas can be flowed axially.

The tube 6, if stainless steel, must be heated in the present process from room temperature to within the range of 1800–2400 degrees F., typically approximately 2100 degrees F. for proper annealing. The net increase of tube temperature is proportional to the $I^2R$ factor of the resistive circuit and to the time required for a given point on the tube to travel between the two brush sets 10, 11 and 14, 15. The latter in turn is related to the speed of advance of the tube. Another parameter is the distance between brushes which can vary from 3 to 10 feet. Up to a point, higher speeds of advance can be accommodated by increased currents applied through the brushes. Practically, however, speed of advance is limited by the upper limits of the speeds of welding. FIG. 7 is a table which shows the applied current requirements and other parameters for two specific tube sizes at their respective weld speeds to realize final annealing temperatures of 2100°–2150° F.

In summary, an improved process is described for the continuous production of tubing, particularly stainless steel beverage tubing. Numerous variations on the described process and apparatus will occur to persons versed in the art and all such variations are expressly reserved within the legitimate scope of the claims to follow which characterize the invention.

What is claimed is:

1. A process for continuous manufacture of small diameter annealed stainless steel tubing, comprising the steps of:

forming a welded seamed stainless steel tube, advancing the welded tube between first and second spaced-apart and current-carrying pairs of opposed graphite brushes mounted about a central rod, contacting said tube between said opposed brushes by biasing the rods of each brush pair together a preselected amount, and quenching the heated tube prior to its reaching said second brush pair by advancing same through a circulating coolant contained in an open-ended chamber and within said chamber feeding a plurality of coolant and streams radially and uniformally upon said tube surface.

2. The process pursuant to claim 1, wherein said brushes are graphite discs each disc rotatably mounted on a respective said rod, and each rod being aligned normal to the path of tube advance.

3. The process pursuant to claim 2, wherein said rods mounting the opposing said discs are connected to first and second pivotally mounted arms, and wherein said contacting step comprises spring-biasing said arms together.

4. The process pursuant to claim 3, wherein said quenching step comprises immersing the heated tube in a coolant contained in an open-ended cylinder and therein, interiorly of each said open end, directing first and second sets of coolant streams radially and uniformly around said tube.

5. The process pursuant to claim 4, comprising the further step of enveloping the tube's heated portion in a heat-impervious quartz envelop filled with a circulating inert gas.

6. The process pursuant to claim 2, comprising the further step of exposing said advancing tube to new electrical contacting surfaces by rotating said graphic discs to unused portions thereof while adjusting said spring bias between said arms to a new preselected value.

References Cited

UNITED STATES PATENTS

| 1,285,887 | 11/1918 | Alexander et al. | 148—154 |
| 1,355,521 | 10/1920 | Alexander et al. | 148—150 |
| 1,570,815 | 1/1926 | Wylie | 148—154 |
| 2,240,019 | 4/1941 | Quarnstrom | 148—127 |
| 2,748,039 | 5/1956 | Adams et al. | 148—12.4 |
| 2,930,724 | 3/1960 | Rudd | 148—150 |

L. DEWAYNE RUTLEDGE, Primary Examiner

W. W. STALLARD, Assistant Examiner

U.S. Cl. X.R.

148—150, 156; 219—67